United States Patent
Mori et al.

(10) Patent No.: US 9,451,116 B2
(45) Date of Patent: Sep. 20, 2016

(54) IMAGE FORMING APPARATUS HAVING A DENSITY SENSOR MOVABLE IN A MAIN SCANNING DIRECTION

(71) Applicants: Atsushi Mori, Tokyo (JP); Shinji Kato, Kanagawa (JP); Masaru Kumagai, Kanagawa (JP)

(72) Inventors: Atsushi Mori, Tokyo (JP); Shinji Kato, Kanagawa (JP); Masaru Kumagai, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/499,733

(22) Filed: Sep. 29, 2014

(65) Prior Publication Data
US 2015/0110514 A1 Apr. 23, 2015

(30) Foreign Application Priority Data
Oct. 17, 2013 (JP) .................. 2013-216475

(51) Int. Cl.
G03G 15/00 (2006.01)
H04N 1/047 (2006.01)
H04N 1/028 (2006.01)

(52) U.S. Cl.
CPC .......... *H04N 1/047* (2013.01); *G03G 15/5041* (2013.01); *G03G 15/5058* (2013.01); *H04N 1/02885* (2013.01)

(58) Field of Classification Search
CPC ................ G03G 15/5025; G03G 15/5058
USPC .................................................. 399/72, 74
See application file for complete search history.

(56) References Cited

U.S. PATENT DOCUMENTS

| | | | |
|---|---|---|---|
| 2005/0157327 A1* | 7/2005 | Shoji | G06F 11/0754 358/1.14 |
| 2007/0019976 A1 | 1/2007 | Watanabe et al. | |
| 2007/0025748 A1 | 2/2007 | Ishibashi et al. | |
| 2010/0092198 A1* | 4/2010 | Shirafuji | G03G 15/0178 399/66 |
| 2012/0099165 A1 | 4/2012 | Omori et al. | |
| 2012/0229866 A1* | 9/2012 | Miyazaki | H04N 1/407 358/3.13 |
| 2013/0259496 A1* | 10/2013 | Kato | G03G 15/0126 399/40 |

FOREIGN PATENT DOCUMENTS

| JP | 2012-063560 | 3/2012 |
|---|---|---|
| JP | 2012-088522 | 5/2012 |

\* cited by examiner

*Primary Examiner* — Walter L Lindsay, Jr.
*Assistant Examiner* — Philip Marcus T Fadul
(74) *Attorney, Agent, or Firm* — Oblon, McClelland, Maier & Neustadt, L.L.P

(57) ABSTRACT

An image forming apparatus includes a photoconductor, an optical scanner, a development device, a movable density sensor, a density sensor driver, and a processor. The optical scanner includes a light source to emit light, and irradiates a surface of the photoconductor in a main scanning direction with the light to form a latent image on the surface of the photoconductor. The development device develops the latent image into a toner image. The density sensor detects unevenness in density of the toner image in the main scanning direction. The density sensor driver moves the density sensor in the main scanning direction. The processor corrects a driving signal for the light source according to image data to reduce the unevenness in density in the main scanning direction, according to positional data of the density sensor in the main scanning direction and an output value of the density sensor.

18 Claims, 15 Drawing Sheets

IMAGE FORMING APPARATUS HAVING A DENSITY SENSOR MOVABLE IN A MAIN SCANNING DIRECTION

CROSS-REFERENCE TO RELATED APPLICATIONS

This patent application is based on and claims priority pursuant to 35 U.S.C. §119(a) to Japanese Patent Application No. 2013-216475, filed on Oct. 17, 2013, in the Japan Patent Office, the entire disclosure of which is hereby incorporated by reference herein.

BACKGROUND

1. Technical Field

Embodiments of the present invention generally relate to an image forming apparatus, and more specifically, to an image forming apparatus using laser light.

2. Background Art

Various types of electrophotographic image forming apparatuses are known, including copiers, printers, facsimile machines, or multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor serving as an image carrier. An optical writer irradiates the surface of the photoconductor thus charged with a light beam to form an electrostatic latent image on the surface of the photoconductor according to the image data. A development device supplies toner to the electrostatic latent image thus formed to render the electrostatic latent image visible as a toner image. The toner image is then transferred onto a recording medium directly or indirectly via an intermediate transfer belt. Finally, a fixing device applies heat and pressure to the recording medium carrying the toner image to fix the toner image onto the recording medium. Thus, the image is formed on the recording medium.

SUMMARY

In one embodiment of this disclosure, an improved image forming apparatus is described that includes a photoconductor, an optical scanner, a development device, a movable first density sensor, a density sensor driver, and a processor. The optical scanner includes a light source to emit light, and irradiates a surface of the photoconductor in a main scanning direction with the light to form a latent image on the surface of the photoconductor. The development device develops the latent image into a toner image. The movable first density sensor detects unevenness in density of the toner image in the main scanning direction. The density sensor driver moves the first density sensor in the main scanning direction. The processor corrects a driving signal for the light source according to image data to reduce the unevenness in density in the main scanning direction, according to positional data of the first density sensor in the main scanning direction and an output value of the first density sensor.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein.

Figure 1:
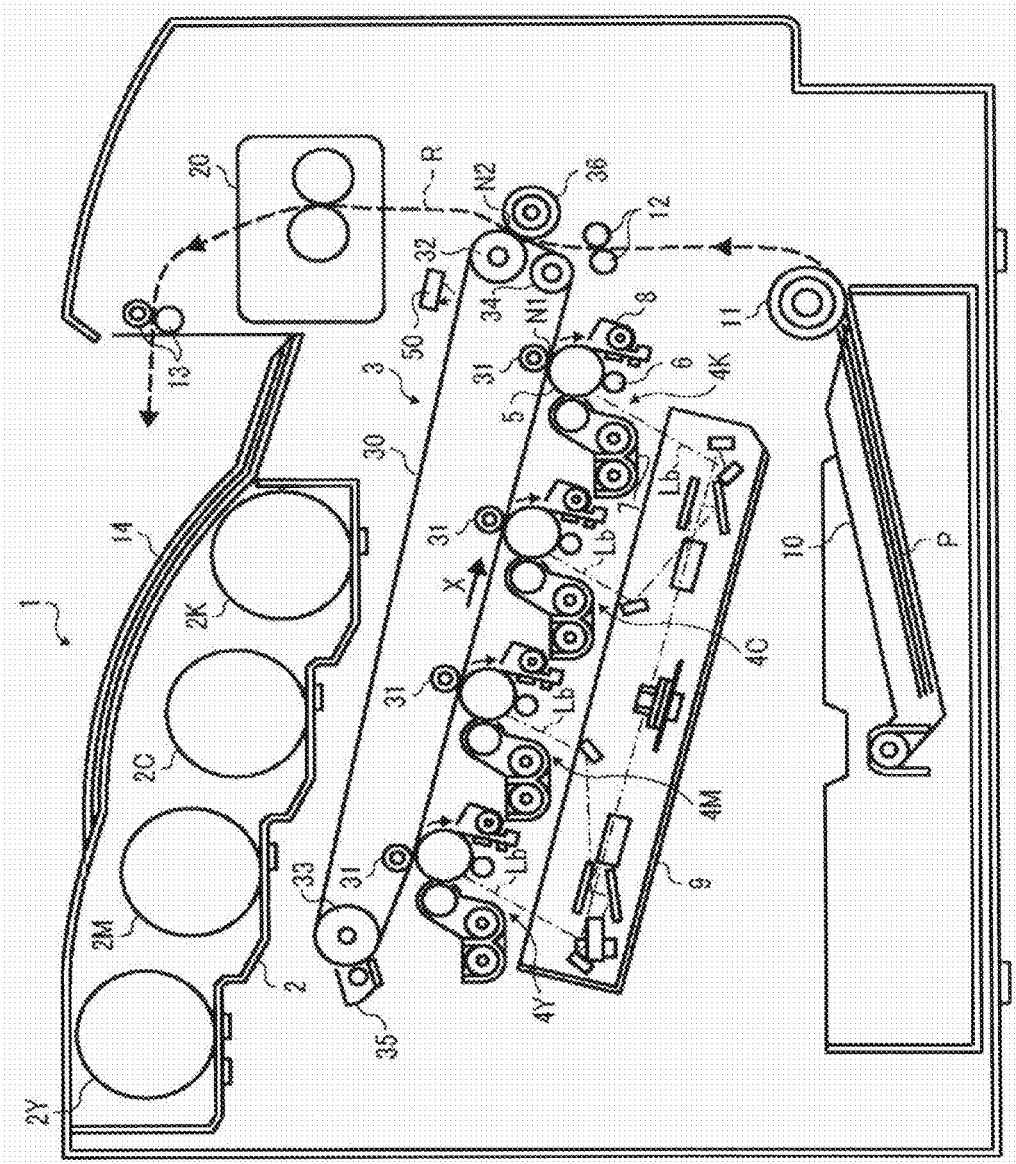
FIG. 1 is a schematic view of an image forming apparatus according to an embodiment of the present invention.

The accompanying drawings are intended to depict embodiments of the present invention and should not be interpreted to limit the scope thereof The accompanying drawings are not to be considered as drawn to scale unless explicitly noted.

DETAILED DESCRIPTION

In describing embodiments illustrated in the drawings, specific terminology is employed for the sake of clarity.

However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the invention and all of the components or elements described in the embodiments of the present invention are not necessarily indispensable to the present invention.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

It is to be noted that, in the following description, suffixes Y, M, C, and K denote colors yellow, magenta, cyan, and black, respectively. To simplify the description, these suffixes are omitted unless necessary.

Referring now to the drawings, wherein like reference numerals designate identical or corresponding parts throughout the several views, embodiments of the present invention are described below.

According to an embodiment of the present invention, an image forming apparatus drives a density sensor for shading correction in a main scanning direction with a density sensor drive mechanism. By measuring density for shading correction while moving the density sensor in the main scanning direction, the image forming apparatus can continuously measure density data at a plurality of positions on an image carrier with the same sensor. Accordingly, the single sensor enhances shading correction at high resolution and low production costs, without requiring interpolation such as linear interpolation.

Initially with reference to FIG. 1, a description is given of an overall configuration and operation of an image forming apparatus 1 according to an embodiment of the present invention.

FIG. 1 is a schematic view of the image forming apparatus 1. In the present embodiment, the image forming apparatus 1 is a color laser printer.

The image forming apparatus 1 includes four centrally located imaging units 4Y, 4M, 4C, and 4K. The imaging units 4Y, 4M, 4C, and 4K are identical in configuration, except that they accommodate developers of different colors. Specifically, the imaging units 4Y, 4M, 4C, and 4K accommodate developers of yellow (Y), magenta (M), cyan (C), and black (K), respectively, which are used to form a color toner image.

Each of the imaging units 4Y, 4M, 4C, and 4K includes, e.g., a drum-shaped photoconductor 5 serving as an image carrier that carries an electrostatic latent image and a resultant toner image, a charger 6 that charges an outer circumferential surface of the photoconductor 5, a development device 7 that supplies toner to the electrostatic latent image formed on the outer circumferential surface of the photoconductor 5 to render the electrostatic latent image visible as a toner image, and a cleaner 8 that cleans the outer circumferential surface of the photoconductor 5. It is to be noted that, in FIG. 1, reference numerals are assigned to the photoconductor 5, the charger 6, the development device 7, and the cleaner 8 of the imaging unit 4K that forms a black toner image, whereas reference numerals for the imaging units 4Y, 4M, and 4C that form yellow, magenta, and cyan toner images, respectively, are omitted.

An exposure device 9 serving as an optical scanner is disposed below the imaging units 4Y, 4M, 4C, and 4K. The exposure device 9 includes, e.g., a light source to emit a laser light beam Lb, a polygon mirror to polarize the laser light beam Lb, and a scanning optical system including an f-θ lens and reflection mirrors to direct the laser light beam Lb to the outer circumferential surfaces of the photoconductors 5. Thus, the exposure device 9 irradiates the outer circumferential surfaces of the respective photoconductors 5 with the laser light beam Lb according to image data.

As the polygon mirror rotates, it moves an optical spot formed on the outer circumferential surface of each photoconductor 5 axially along the photoconductor 5. Thus, one-line scanning is performed. Upon completion of the one-line scanning, the photoconductor 5 is rotated for a next scanning. It is to be noted that the axial direction of the photoconductors 5 is referred to as the main scanning direction, and a rotational direction of the photoconductors 5 is referred to as the sub-scanning direction. The position of the optical spot on the outer circumferential surface of each photoconductor 5 in the main scanning direction is referred to as the image height.

A transfer device 3 is disposed above the imaging units 4Y, 4M, 4C, and 4K. The transfer device 3 includes, e.g., an intermediate transfer belt 30 serving as an intermediate transfer body, four primary transfer rollers 31 serving as primary transfer devices, a secondary transfer roller 36 serving as a secondary transfer device, a secondary transfer backup roller 32, a cleaning backup roller 33, a tension roller 34, and a belt cleaner 35.

The intermediate transfer belt 30 is an endless belt stretched around the secondary transfer backup roller 32, the cleaning backup roller 33, and the tension roller 34. In the present embodiment, the secondary transfer backup roller 32 is rotated to rotate the intermediate transfer belt 30 in a direction indicated by arrow X in FIG. 1.

The intermediate transfer belt 30 is sandwiched between the four primary transfer rollers 31 and the respective photoconductors 5. Thus, four primary transfer areas herein called primary transfer nips N1 are formed between the intermediate transfer belt 30 and the photoconductors 5. The primary transfer rollers 31 are connected to a power supply that applies a predetermined direct current (DC) voltage and/or alternating current (AC) voltage to each of the primary transfer rollers 31.

The intermediate transfer belt 30 is also sandwiched between the secondary transfer roller 36 and the secondary transfer backup roller 32. Thus, a secondary transfer area herein called a secondary transfer nip N2 is formed between the secondary transfer roller 36 and the intermediate transfer belt 30. Similar to the primary transfer rollers 31, the secondary transfer roller 36 is connected to the power supply that applies a predetermined direct current (DC) voltage and/or alternating current (AC) voltage to the secondary transfer roller 36.

The belt cleaner 35 includes a cleaning brush and a cleaning blade that contact an outer circumferential surface of the intermediate transfer belt 30. A waste toner conveyance tube extending from the belt cleaner 35 to an intake of a waste toner container conveys waste toner collected from the intermediate transfer belt 30 by the belt cleaner 35 to the waste toner container. A density sensor 50, described later, is disposed where the density sensor 50 can measure the outer circumferential surface of the intermediate transfer belt 30, with, e.g., support members and a density sensor driver described later.

A bottle holder 2 is disposed in an upper portion of the image forming apparatus 1. Toner bottles 2Y, 2M, 2C, and 2K are detachably attached to the bottle holder 2 to contain fresh toner of yellow, magenta, cyan, and black, respectively. The fresh toner is supplied from the toner bottles 2Y, 2M, 2C, and 2K to the respective development devices 7 through toner supply tubes connecting the toner bottles 2Y, 2M, 2C, and 2K with the respective development devices 7.

A tray 10 is disposed in a lower portion of the image forming apparatus 1. The tray 10 accommodates recording media such as a plurality of sheets P of plain paper. Alternatively, the recording media may be, e.g., postcards, envelopes, overhead projector (OHP) transparencies, or sheets of thick paper, thin paper, coated paper, art paper, or tracing paper. A feed roller 11 is also disposed in the lower portion of the image forming apparatus 1. The feed roller 11 feeds a sheet P from the tray 10 toward the secondary transfer nip N2 formed between the secondary transfer roller 36 and the intermediate transfer belt 30. Additionally, a bypass tray may be attached to the image forming apparatus 1 to place such recording media thereon.

A conveyance passage R extends from the feed roller 11 to a pair of discharge rollers 13 to convey the sheet P from the tray 10 to the pair of discharge rollers 13 through the secondary transfer nip N2, and consequently, out of the image forming apparatus 1. In the conveyance passage R, a pair of timing rollers 12 is disposed upstream from the secondary transfer nip N2 in a direction in which the sheet P is conveyed (hereinafter simply referred to as sheet conveying direction). The pair of timing rollers 12 sends out the sheet P fed from the feed roller 11 toward the secondary transfer nip N2 at a predetermined time.

A fixing device 20 is disposed downstream from the secondary transfer nip N2 in the sheet conveying direction in the conveyance passage R. A toner image transferred from the intermediate transfer belt 30 onto the sheet P at the secondary transfer nip N2 is fixed on the sheet P in the fixing device 20. The pair of discharge rollers 13 is disposed downstream from the fixing device 20 in the sheet conveying direction in the conveyance passage R. The pair of discharge rollers 13 discharges the sheet P carrying the fixed toner image outside the image forming apparatus 1, specifically onto a discharge tray 14 disposed atop the image forming apparatus 1. The output tray 14 stocks the sheet P discharged by the pair of discharge rollers 13.

With continued reference to FIG. 1, a description is now given of a basic image forming operation of the image forming apparatus 1.

When a print job starts, the respective photoconductors 5 of the imaging units 4Y, 4M, 4C, and 4K are rotated in a clockwise direction in FIG. 1. The chargers 6 uniformly charge the outer circumferential surfaces of the photoconductors 5 with an electrical charge of a predetermined polarity. The exposure device 9 irradiates the outer circumferential surfaces of the photoconductors 5 thus charged with the laser light beam Lb according to yellow, magenta, cyan, and black image data constructing image data of a desired full-color image to form electrostatic latent images on the outer circumferential surfaces of the photoconductors 5, respectively. The development devices 7 supply toner to the electrostatic latent images thus formed on the photoconductors 5 to render the electrostatic latent images visible as yellow, magenta, cyan, and black toner images, respectively.

Simultaneously, when the print job starts, the secondary transfer backup roller 32 is rotated in a counterclockwise direction in FIG. 1, thereby rotating the intermediate transfer belt 30 in the direction indicated by arrow X. The power supply applies a constant voltage or a constant current control voltage having a polarity opposite a polarity of the toner to the primary transfer rollers 31 to generate a transfer electric field at each primary transfer nip N1 formed between the photoconductor 5 and the corresponding primary transfer roller 31.

When the yellow, magenta, cyan, and black toner images formed on the photoconductors 5 reach the primary transfer nips N1, respectively, in accordance with rotation of the photoconductors 5, the transfer electric fields generated at the primary transfer nips N1 transfer the yellow, magenta, cyan, and black toner images from the photoconductors 5 onto the intermediate transfer belt 30, respectively, such that the yellow, magenta, cyan, and black toner images are superimposed successively on the intermediate transfer belt 30. Thus, a full-color toner image is formed on the outer circumferential surface of the intermediate transfer belt 30.

In the following description, the term "image carrier(s)" is used to represent the photoconductors 5 and the intermediate transfer belt 30. The image carrier carries a toner image formed thereon by developing an electrostatic latent image formed by an optical scanning system. For example, if an image forming apparatus transfers a toner image onto a printing material such as a sheet of paper from a photoconductor, the photoconductor is an image carrier. By contrast, if an image forming apparatus transfers a toner image onto printing material from a photoconductor via a transfer belt, the photoconductor and the transfer belt are image carriers.

Figure 2:
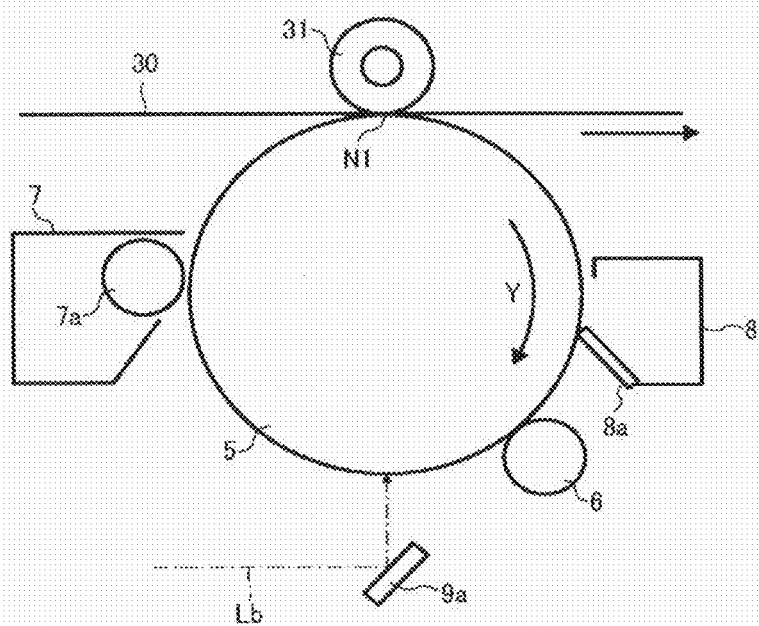
FIG. 2 is a schematic view of an imaging unit incorporated in the image forming apparatus of FIG. 1.

Referring now to FIG. 2, a description is given of the imaging units 4.

FIG. 2 is a schematic view of one of the imaging units 4 with associate components.

Each of the photoconductors 5 is surrounded by the cleaner 8, a charging roller as the charger 6, a mirror 9a of the exposure device 9, and the development device 7, disposed upstream to downstream, in that order, in a direction indicated by arrow Y. The development device 7 includes a development roller 7a. The development roller 7a transfers the toner image formed on the photoconductor 5 onto the intermediate transfer belt 30 at the primary transfer nip N1 formed between the photoconductor 5 and the primary transfer roller 31. The cleaner 8 includes a cleaning blade 8a. After the primary transfer of the toner image from the photoconductor 5 onto the intermediate transfer belt 30, the cleaning blade 8a removes residual toner that failed to be transferred onto the intermediate transfer belt 30 and therefore remaining on the photoconductor 5 from the photoconductor 5. Thereafter, a discharger removes the charge on the outer circumferential surface of the photoconductor 5 to ready the photoconductor 5 for the next image formation.

Referring back to FIG. 1, the feed roller 11 disposed in the lower portion of the image forming apparatus 1 is rotated to feed a sheet P from the tray 10 toward the pair of timing rollers 12 in the conveyance passage R. When the sheet P comes into contact with the pair of timing rollers 12, the pair of timing rollers 12 temporarily stops conveyance of the sheet P.

Thereafter, the pair of timing rollers 12 is rotated at a predetermined time to convey the sheet P to the secondary transfer nip N2 in synchronization with the full-color toner image formed on the intermediate transfer belt 30 reaching the secondary transfer nip N2. At this time, a transfer voltage having a polarity opposite a polarity of the charged toner contained in the full-color toner image formed on the intermediate transfer belt 30 is applied to the secondary transfer roller 36, thereby generating a transfer electric field at the secondary transfer nip N2.

The transfer electric field secondarily transfers the full-color toner image, specifically, yellow, magenta, cyan, and black toner images formed on the intermediate transfer belt 30 onto the sheet P at once. After the secondary transfer of the color toner image from the intermediate transfer belt 30 onto the sheet P, the belt cleaner 35 removes residual toner that failed to be transferred onto the sheet P and therefore remaining on the intermediate transfer belt 30 from the intermediate transfer belt 30. The removed toner is conveyed and collected into the waste toner container.

Thereafter, the sheet P carrying the full-color toner image is conveyed to the fixing device 20 that fixes the full-color toner image onto the sheet P. Then, the sheet P carrying the fixed full-color toner image is discharged by the pair of discharge rollers 13 onto the discharge tray 14 atop the image forming apparatus 1.

The above describes the image forming operation of the image forming apparatus 1 to form the full-color toner image on the sheet P. The present embodiment is described above with reference to the configuration illustrated in FIG. 1, but is not limited thereto. For example, alternatively, the image forming apparatus 1 may transfer directly a toner image from the photoconductors 5 onto the printing material. Alternatively, the image forming apparatus 1 may have a single color development device 7, or have five or more development devices 7. Alternatively, the image forming apparatus 1 may form a bicolor or tricolor toner image by using two or three imaging units 4.

Figure 3A:
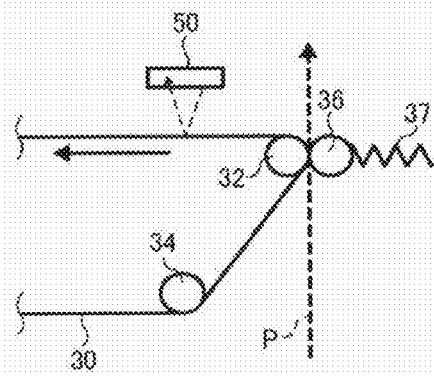
FIG. 3A is a schematic view of a secondary transfer portion of the image forming apparatus of FIG. 1 upon printing.
Figure 3B:
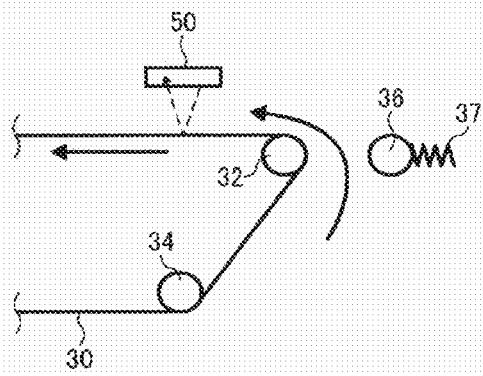
FIG. 3B is a schematic view of the secondary transfer portion of the image forming apparatus of FIG. 1 upon measurement of a reference pattern.

Referring now to FIGS. 3A and 3B, a description is given of the secondary transfer roller 36.

FIG. 3A is a schematic view of a secondary transfer portion of the image forming apparatus 1 upon printing. FIG. 3B is a schematic view of the secondary transfer portion of the image forming apparatus 1 upon measurement of a reference pattern.

As illustrated in FIGS. 3A and 3B, the secondary transfer roller 36 is contactable with and separable from the intermediate transfer belt 30 by a spring 37 and a driver. With this configuration, a test toner image such as a reference pattern described later can be moved to a detection point of the density sensor 50 without being transferred onto the printing material.

With respect to the exposure device 9, the scanning optical system includes optical devices such as a lens, a glass panel, and a mirror, and has different light utilization efficiencies (reflectance or transmittance) depending on the angle of incidence. The lenses have different degrees of thickness depending on the position of incidence.

The laser light beam Lb polarized by the polygon mirror enters the scanning optical system at an angle of incidence corresponding to an angle of polarization by the polygon mirror. Since the position of incidence differs depending on the image height, the strength of the laser light beam Lb on the outer circumferential surface of each photoconductor 5 differs depending on the image height. The difference in strength of the laser light beam Lb depending on the image height is referred to as "shading characteristics", which is a factor that causes unevenness in density of an output image and thus degrades image quality. Hence, there are proposed various ways of correcting the shading characteristics.

For example, a plurality of density sensors are used to measure the density of a reference pattern (toner patch or toner pattern) formed at detection points of the plurality of density sensors. According to output signals of the plurality of density sensors, the shading characteristics in the main scanning direction are obtained by approximation with linear interpolation, a linear function, or a high-order function to correct a driving signal for an optical scanner. Thus, the shading characteristics are corrected.

Figure 18:
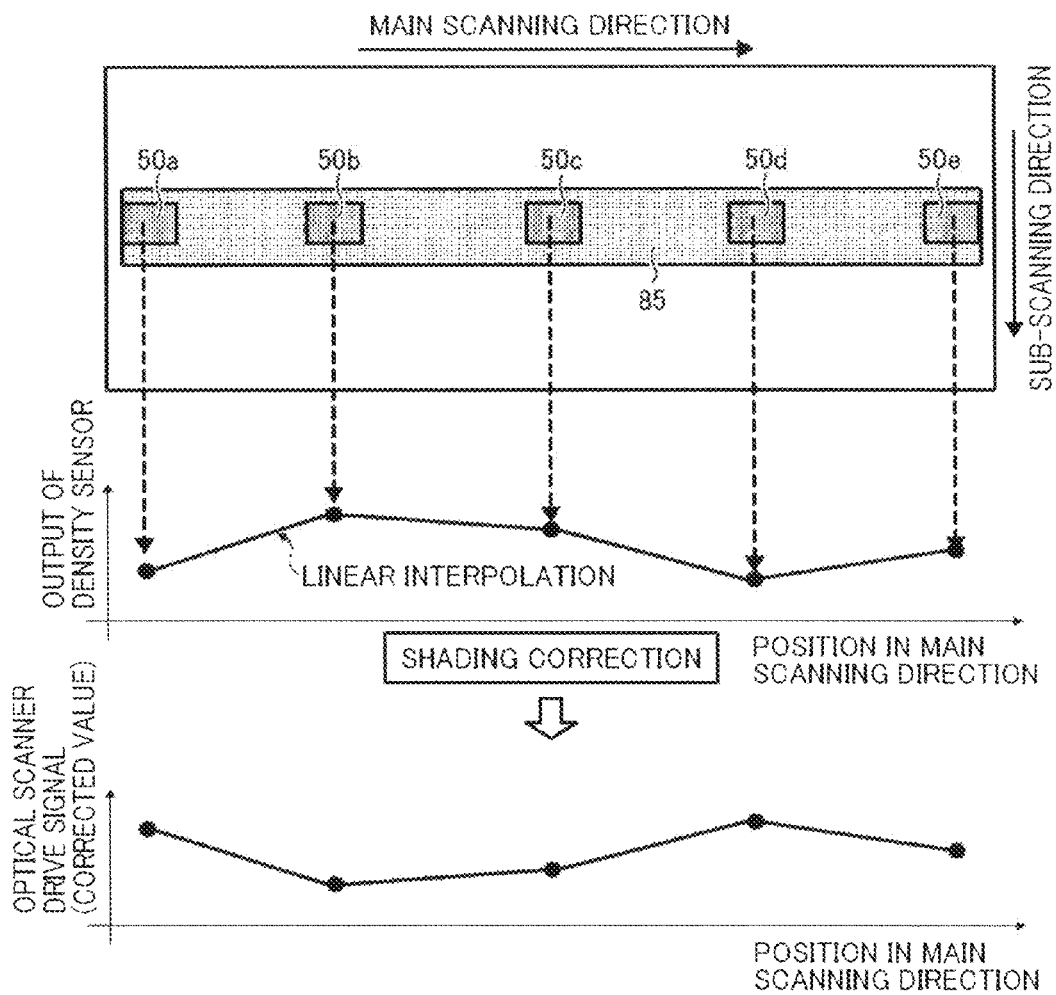
FIG. 18 is a diagram illustrating a comparative shading correction in a main scanning direction.

Specifically, as illustrated in FIG. 18, five density sensors 50a through 50e are disposed in the main scanning direction of an image carrier to measure density of a reference pattern 85 formed by light emission according to a driving signal uniform in the main scanning direction. Then, linear or high-order interpolation is performed on five density values outputted from the density sensors 50a through 50e to calculate an estimate output value at a position in the main scanning direction.

The driving signal for the optical scanner is corrected such that an amount of light emission from the optical scanner is smaller where the estimate output value is higher and larger where the estimate output value is lower. Thus, the image density is equalized in the main scanning direction.

However, there are problems with such shading correction. For example, since the plurality of density sensors is disposed in the main scanning direction to increase resolution, production costs are relatively high. Further, an output adjustor is required to equalize output values among the plurality of density sensors. In short, processing load is relatively large.

Figure 19:
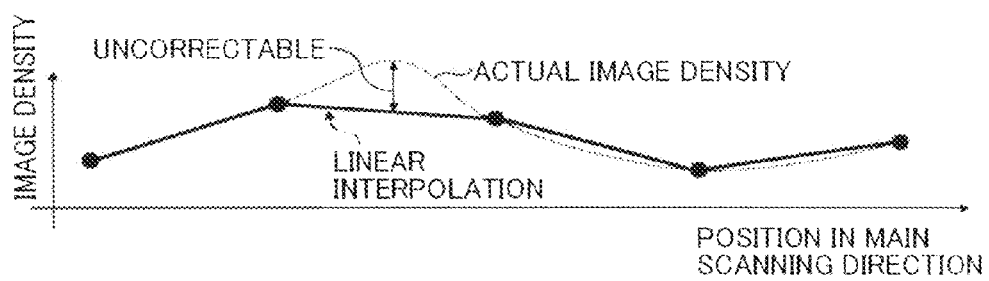
FIG. 19 is a graph of image density illustrating a problem of the comparative shading correction of FIG. 18.

Furthermore, if there is unevenness in density that cannot be interpolated by the linear or high-order interpolation, factors of such unevenness in density cannot be corrected. For example, as illustrated in FIG. 19, if there is irregular unevenness in density between detection points of the plurality of density sensors 50a through 50e, the factors cannot be detected from the data provided by the plurality of density sensors 50a through 50e. Accordingly, the unevenness in density may remain in the main scanning direction after correction.

In an embodiment of the present invention, the image forming apparatus 1 reliably corrects the shading characteristics in the main scanning direction with an inexpensive configuration.

Specifically, according to an embodiment of the present invention, at least one density sensor is driven in the main scanning direction while detecting density. Accordingly, upon shading correction, the resolution in the main scanning direction can be reduced, and therefore, the unevenness in density can be reliably reduced. As described above, using a plurality of density sensors needs an output adjuster to adjust uneven output values of individual sensors, whereas using a single density sensor obviates the need for such an output adjuster.

Since the density sensor measures density while moving, an output value of the sensor and a current position of the sensor are correlated. According to an embodiment of the present invention, a driving signal for an optical scanner is corrected according to data acquired in a density sensor positional data acquisition process. Thus, the unevenness in density in the main scanning direction can be reliably reduced.

The following describes first through seventh embodiments of the present invention in which a density sensor is movably disposed. In the following embodiments, a configuration applicable to the photoconductor 5 is also applicable to the intermediate transfer belt 30, and vice versa.

Figure 4:
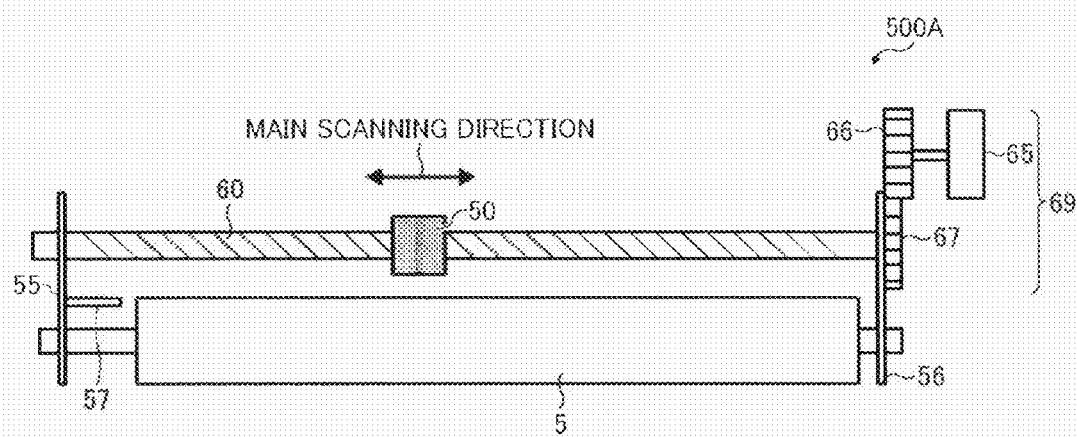
FIG. 4 is a schematic view of a density sensor drive mechanism according to a first embodiment incorporated in the image forming apparatus of FIG. 1.

Referring now to FIG. 4, a description is given of a density sensor drive mechanism 500A according to the first embodiment. FIG. 4 is a schematic view of the density sensor drive mechanism 500A. In the present embodiment, the photoconductor 5 serves as an image carrier.

The photoconductor 5 is rotatably supported by a pair of side plates 55 and 56, and is driven by a drive source. A threaded drive shaft 60 is also rotatably supported by the pair of side plates 55 and 56 parallel to the axis of the photoconductor 5. The density sensor 50 is attached to the drive shaft 60.

The density sensor 50 is slidably engaged with a linear guide device to reciprocate in a longitudinal direction of the drive shaft 60 by rotation of the drive shaft 60. The density sensor 50 measures density of a reference pattern formed on the photoconductor 5 according to a shading correction process described below.

The drive shaft 60 has an end provided with a density sensor driving unit 69 serving as a driver to drive the density sensor 50. The density sensor driving unit 69 includes a stepping motor 65 and gears 66 and 67. The gear 66 is attached to an axis of the stepping motor 65. The gear 67 is attached to the end of the drive shaft 60.

The gears 66 and 67 engage each other while the stepping motor 65 rotates in a forward direction or in a reverse direction. With this configuration, the density sensor 50 reciprocates along the drive shaft 60. It is to be noted that a driver to drive the density sensor 50 is not limited to the density sensor driving unit 69 described above. Alternatively, a belt drive may move the density sensor 50, or a single direction in which a drive source rotates allows the density sensor 50 to reciprocate.

The side plate 55 is provided with a home position mark 57 disposed flush with the outer circumferential surface of the photoconductor 5 in an axial direction thereof. The home position mark 57 serves as a home position detector to enhance accurate detection of the position of the density sensor 50 in the main scanning direction.

When the density sensor 50 reaches a position where the density sensor 50 faces the home position mark 57, and measures a surface of the home position mark 57, the density sensor 50 outputs a predetermined value. By the predetermined output value of the density sensor 50, it is detected that the density sensor 50 reaches the position where the density sensor 50 faces the home position mark 57. Thus, a correct reference position of the density sensor 50 can be determined.

In the present embodiment, as illustrated in FIG. 4, the home position mark 57 is disposed outside the photoconductor 5 in the main scanning direction. Alternatively, if the photoconductor 5 has a larger width than an image forming area of the image forming apparatus 1, the home position mark 57 may be disposed outside the image forming area within the width of the photoconductor 5. Instead of using the home position mark 57, an optical path shielder may be used to block an optical path of the density sensor 50. In this case, when the density sensor 50 is at the reference position, the optical path shielder blocks an optical path of a transmissive photosensor (i.e. the density sensor 50) to enable detection of the reference position of the density sensor 50.

Figure 5A:
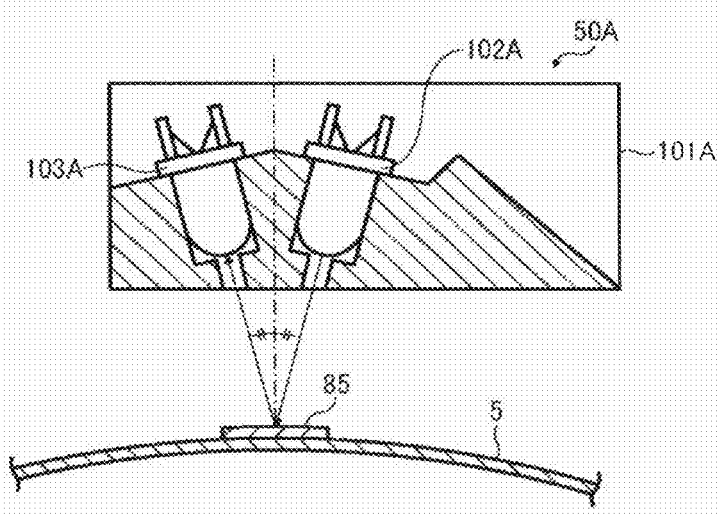
FIG. 5A is a schematic view of a density sensor incorporable in the image forming apparatus of FIG. 1.
Figure 5B:
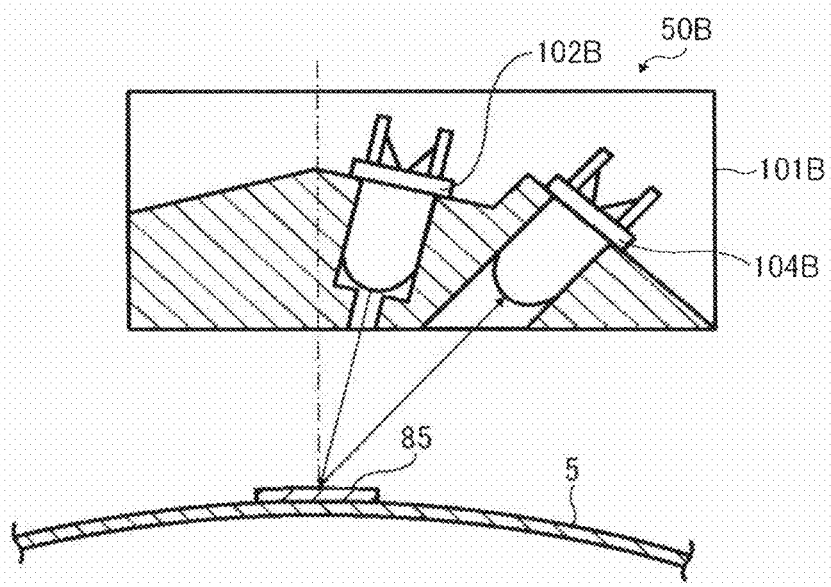
FIG. 5B is a schematic view of an alternative density sensor.
Figure 5C:
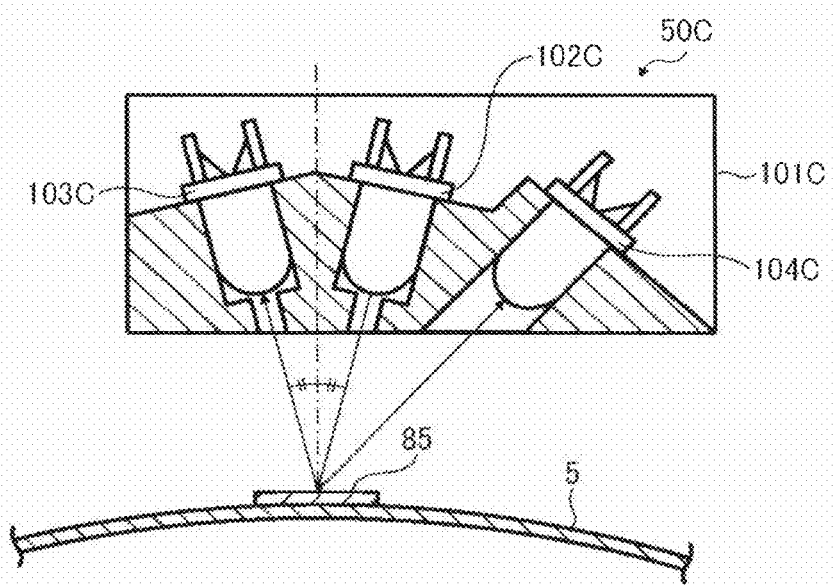
FIG. 5C is a schematic view of another alternative density sensor.

Referring now to FIGS. 5A through 5C, a detailed description is given of the density sensor 50. Generally, a density sensor that can be used as the density sensor 50 optically detects density using a light-emitting device and a light-receiving device. For example, the density sensor is a reflective photosensor using a light-emitting diode (LED) as the light-emitting device and a photodiode (PD) as the light-receiving device. Alternatively, the density sensor uses a PD and a phototransistor (PTr) as the light-emitting devices.

FIGS. 5A through 5C illustrates different types of such a reflective photosensor. FIG. 5A is a schematic view of a density sensor 50A that includes a light-emitting device 102A (LED) and a light-receiving device 103A in a holder 101A to detect only regular reflection light from a reference pattern 85 (toner patch or toner pattern) formed on the photoconductor 5. FIG. 5B is a schematic view of a density sensor 50B that includes a light-emitting device 102B (LED) and a light-receiving device 104B in a holder 101B to detect only diffuse reflection light from the reference pattern 85. FIG. 5C is a schematic view of a density sensor 50C that includes a light-emitting device 102C (LED) and light-receiving devices 103C and 104C in a holder 101C to detect both the regular reflection light and the diffuse reflection light from the reference pattern 85.

Such a reflective photosensor is selected as appropriate depending on, e.g., the type of toner used (e.g., black or other colors) and/or conditions of background areas of the photoconductor 5 used. For example, if black toner is used, the difference between the regular reflectance from the black toner and regular reflectance from a background area of the photoconductor 5 is relatively large. In this case, the density sensor 50A may be selected. By contrast, if toner of another color is used, the difference between the regular reflectance from the toner of another color and the regular reflectance from the background area of the photoconductor 5 is relatively small. If the density sensor 50A is used in this case, the detection accuracy might be decreased.

Accordingly, if the toner of another color is used, the density sensor 50B may be selected. If both the black toner and the toner of another color are used, the density sensor 50B may be selected, or more preferably, the density sensor 50C may be selected. In the present embodiment, the density sensor 50 is an optical sensor that detects a surface condition of the photoconductor 5 by a difference between incident light and reflection light. The density sensor 50C is employed as the density sensor 50.

Figure 6:
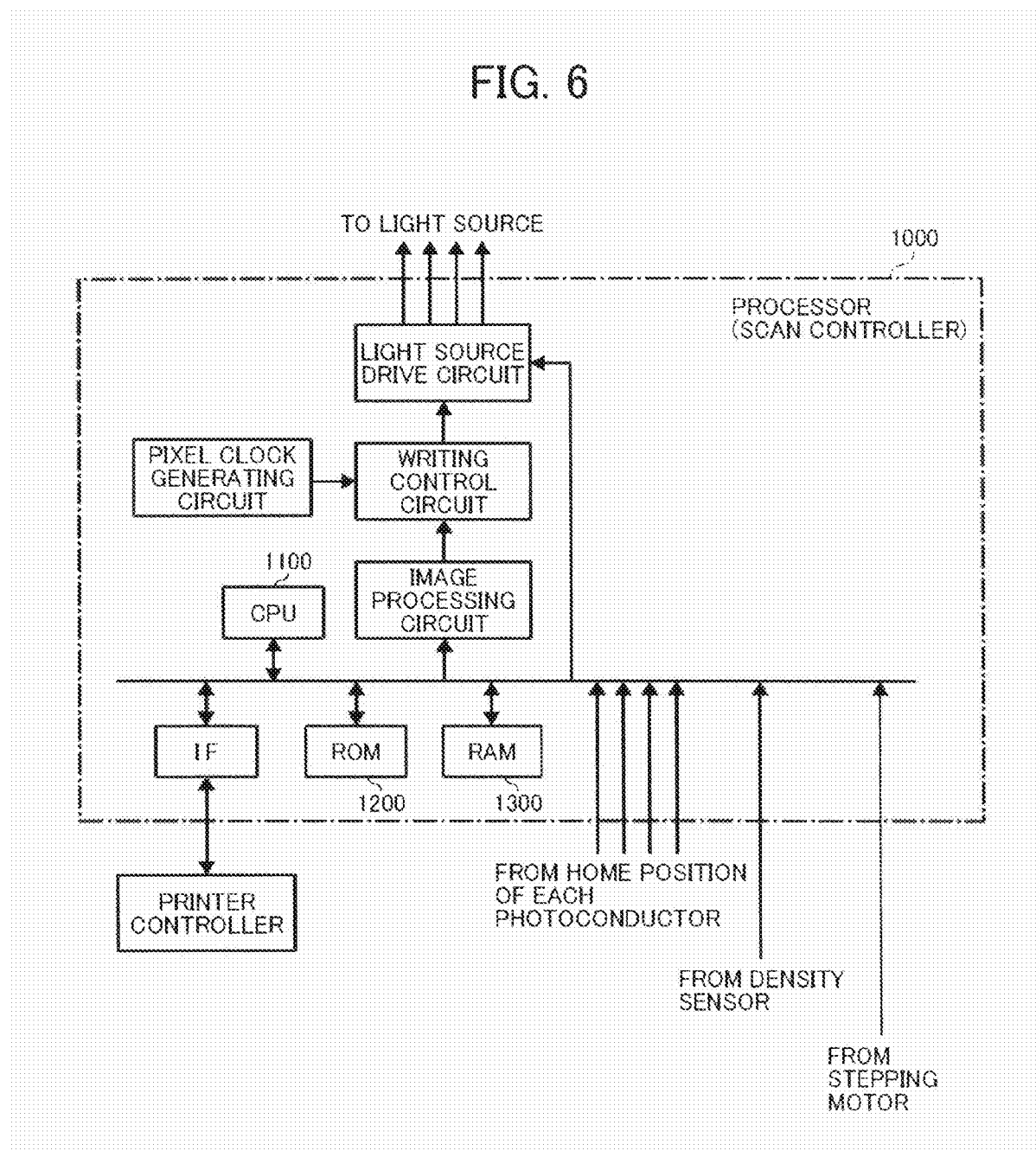
FIG. 6 is a block diagram of a processor incorporated in the image forming apparatus of FIG. 1.

The image forming apparatus 1 includes a processor 1000, which is illustrated in FIG. 6. The processor 1000 includes memory devices, namely, a read-only memory (ROM) 1200 and a random access memory (RAM) 1300. The ROM 1200 is a storage device that stores a program. According to the program, the processor 1000 acquires density sensor data, and corrects optical scanning. Acquiring the density sensor data includes acquiring density sensor output data and density sensor positional data.

In the first embodiment, the stepping motor 65 is used as a drive source of the density sensor 50. Alternatively, e.g., a DC motor may be used as the drive source of the density sensor 50. In this case, a rotary encoder is disposed on the shaft of the DC motor. The processor 1000 acquires rotational data of the rotary encoder, instead of the rotational data of the stepping motor 65, to acquire the density sensor data (first density sensor positional data process).

Referring now to FIG. 6, a detailed description is given of the processor 1000.

FIG. 6 is a block diagram of the processor 1000.

As described above, the image forming apparatus 1 includes the processor 1000 serving as a scan controller. The processor 1000 acquires the density sensor data including the output data of the density sensor 50 and the rotational data of the stepping motor 65 serving as a drive source, and corrects the optical scanning, specifically, a driving signal for the exposure device 9 serving as an optical scanner according to the shading correction process described later.

The processor 1000 obtains an equation for correcting light-emitting power to reduce unevenness in density in the main scanning direction, according to the density sensor data acquired from a reference pattern for reducing the unevenness in density in the main scanning direction, for each imaging unit 4 at each predetermined time. Upon image formation, the processor 1000 generates a light correction signal using the equation for each imaging unit 4 to correct a driving signal for each light-emitting device 102 of the density sensor 50.

Figure 7:
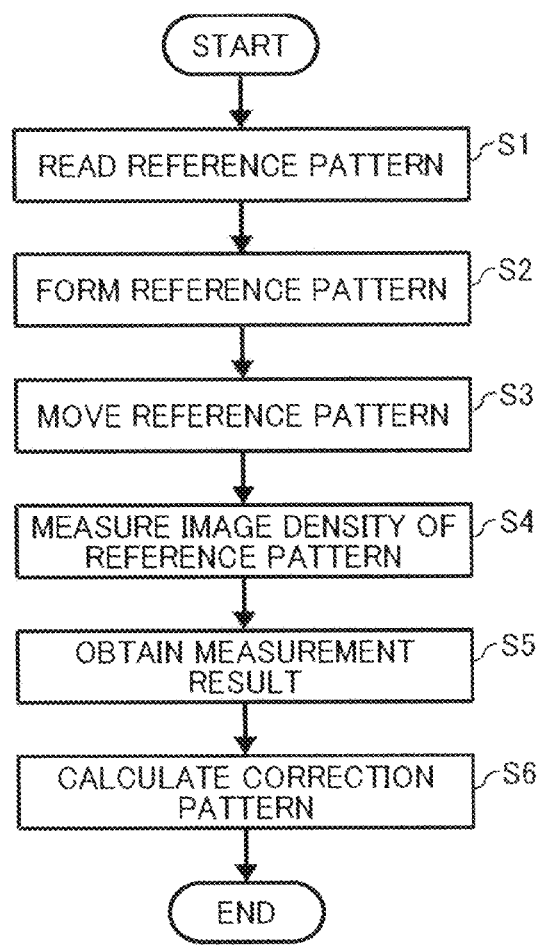
FIG. 7 is a flowchart of a shading correction process according to the first embodiment.

Referring now to FIGS. 7 and 8, a detailed description is given of the shading correction.

Initially with reference to FIG. 7, a description is given of a shading correction process.

FIG. 7 is a flowchart of the shading correction process according to the first embodiment. When the shading correction process starts, the exposure device 9 (optical scanner) reads a predetermined reference pattern for shading correction from memories of the image forming apparatus 1, such as the ROM 1200 and the RAM 1300 (S1). Then, the exposure device 9 irradiates each of the photoconductors 5 with the laser light beam Lb according to the reference pattern thus read to form an electrostatic latent image on each of the photoconductors 5 (S2). Each of the development devices 7 develops the electrostatic latent image thus formed with toner. Thus, a visible toner image is formed on each of the photoconductors 5. It is to be noted that the reference pattern is generated in advance according to scan data of a reference white board having a predetermined even density.

The reference pattern thus developed is then transferred from each of the photoconductors 5 onto the intermediate transfer belt 30. Thus, a unified reference pattern is formed on the intermediate transfer belt 30. The reference pattern is moved along with movement of the intermediate transfer belt 30 to a detection point of the density sensor 50 (S3). When the reference pattern reaches the detection point, the intermediate transfer belt 30 is stopped so that the density sensor 50 can measure the image density of the reference pattern (S4).

The processor 1000 acquires readings that are the measured density data correlated with a position of the density sensor 50 in the main scanning direction calculated from the rotational data of the stepping motor 65 (S5). Finally, according to the readings, the processor 1000 calculates a correction pattern for correcting a driving signal for the exposure device 9, as correcting the optical scanning (S6). Imaging process is performed by optical scanning using the correction pattern. By following the above-described process, the driving signal for the exposure device 9 is corrected. As a result, the unevenness in density in the main scanning direction can be reduced.

Figure 8A:
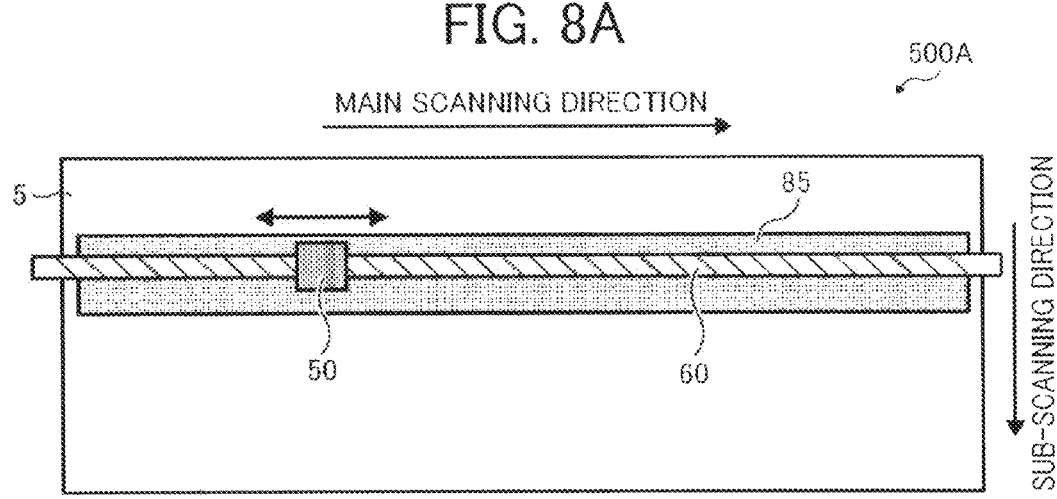
FIG. 8A is a plan view of the density sensor drive mechanism with a reference pattern.
Figure 8B:
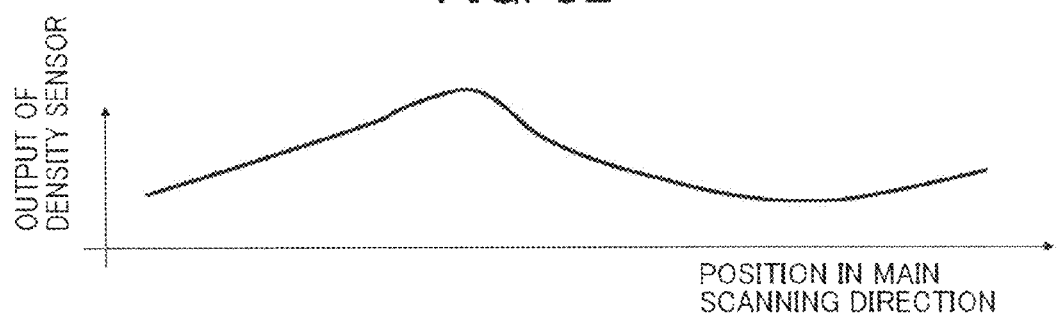
FIG. 8B is a graph of density sensor output.
Figure 8C:
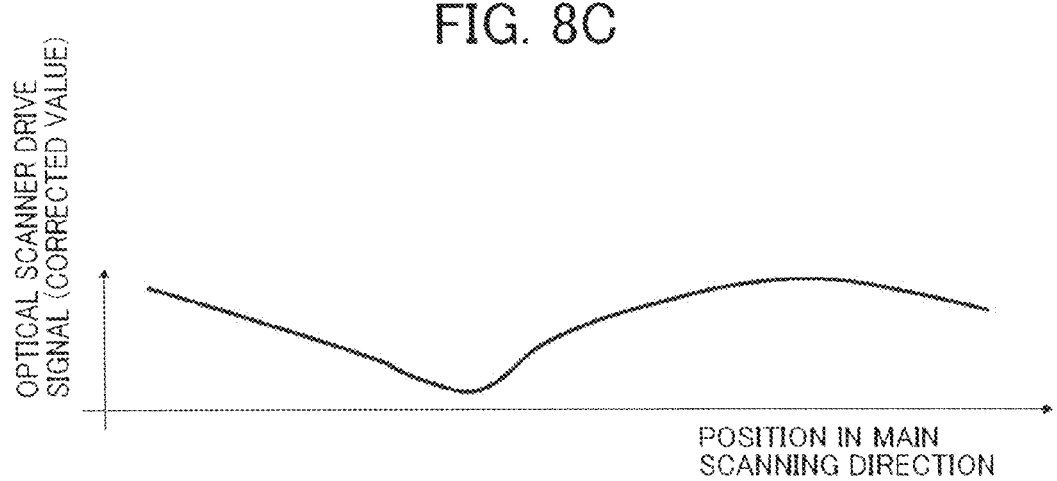
FIG. 8C is a graph of an optical scanner driving signal.

Referring now to FIGS. 8A through 8C, a description is given of how the shading correction is performed.

FIG. 8A is a plan view of the density sensor drive mechanism 500A with the reference pattern 85. FIG. 8B is a graph of density sensor output. FIG. 8C is a graph of the optical scanner driving signal.

As illustrated in FIG. 8A, the density sensor 50 continuously measures the density of the reference pattern 85 formed on the photoconductor 5 while being moved by the density sensor driving unit 69, illustrated in FIG. 4, in the main scanning direction. The processor 1000 acquires the density sensor data, specifically, data of the density thus measured by the density sensor 50.

Simultaneously, the processor 1000 acquires the rotational data of the stepping motor 65 serving as a drive source. A relationship between a rotational amount of the stepping motor 65 and a moving amount of the density sensor 50 are measured in advance and stored in the ROM 1200. Accordingly, the positional data of the density sensor 50 can be assumed by the rotational data of the stepping motor 65.

Then, the density data and the positional data of the density sensor 50 in the main scanning direction are correlated as illustrated in FIG. 8B. From the relationship between the density data and the positional data of the density sensor 50 in the main scanning direction, the processor 1000 corrects the driving signal for the optical scanner 9 (i.e., optical scanner driving signal) as illustrated in FIG. 8C.

The basis of correction is the same as a comparative correction process illustrated in FIG. 18. However, in the present embodiment, the single density sensor 50 measures density while moving in the main scanning direction, thereby continuously acquiring the density data in the main scanning direction, unlike the comparative correction illustrated in FIG. 18. Accordingly, in the present embodiment, the density data can be accurately detected even if local unevenness in density exists between density sensors in the main scanning direction as illustrated in FIG. 19.

In addition, using the single density sensor 50 obviates the need for an output adjuster that adjusts different output values among a plurality of density sensors. In other words, it is not necessary to increase the number of density sensors according to the resolution. As a result, production costs can be reduced.

Figure 9:
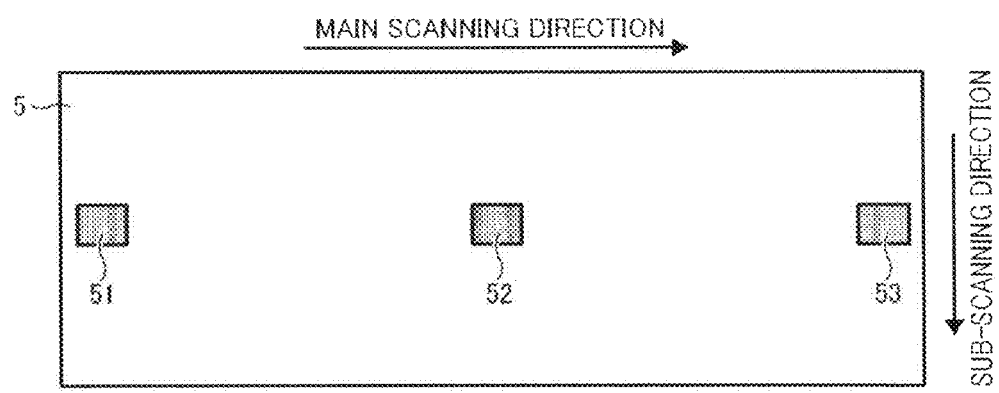
FIG. 9 shows a layout of a plurality of density sensors for adjusting image density.

Referring now to FIG. 9, a description is given of a problem that can be solved by the second embodiment of the present invention.

FIG. 9 is a layout of a plurality of density sensors 51 through 53 for adjusting image density.

Some image forming apparatuses may have the plurality of density sensors 51 through 53 in the main scanning direction as illustrated in FIG. 9 because installation errors of machine and/or configuration of a development device may cause unevenness in density in the main scanning direction even under the same image forming conditions. The unevenness in density may be caused by deterioration of the machine and/or changes in toner stability over time and/or due to the environment. To correct the unevenness in density, a predetermined reference pattern is formed on the photoconductor 5 and the density sensors 51 through 53 (sensors for adjusting image density) measure the density of the reference pattern to adjust the image forming conditions such as toner density and development bias.

Generally, each of the density sensors 51 through 53 may have any one of the configurations illustrated in FIGS. 5A through 5C. In other words, the density sensors 51 through 53 for adjusting image density have the same configuration as the density sensor 50. In such a case, the density of the reference pattern can be measured across the main scanning direction by moving the density sensor 50 in the configuration illustrated in FIG. 4. In other words, the three density sensors 51 through 53 of FIG. 9 can be unified into a single sensor.

On the other hand, some image forming apparatuses may not be able to fine-tune the image forming conditions in the main scanning direction. For example, such image forming apparatuses may uniformly correct the image forming conditions in the main scanning direction, such that an average value of density measured by a plurality of sensors becomes a target density value. In such a way of correction of the image forming conditions, sufficient data may be acquired by measuring several positions as illustrated in FIG. 9.

In such a case, if the three density sensors 51 through 53 of FIG. 9 are unified into a single sensor and are driven in the configuration illustrated in FIG. 4, a measuring time may be longer than a measuring time taken when the plurality of sensors 51 through 53 are used as illustrated in FIG. 9, because the speed at which a density sensor driving unit drives a density sensor is limited.

Generally, image forming conditions are corrected more frequently than the shading is corrected. Accordingly, any increase in the measuring time may generate a "standby time" during which image formation cannot be performed. For mass high-speed printing, the standby time may be a bigger problem than production costs.

Figure 10:
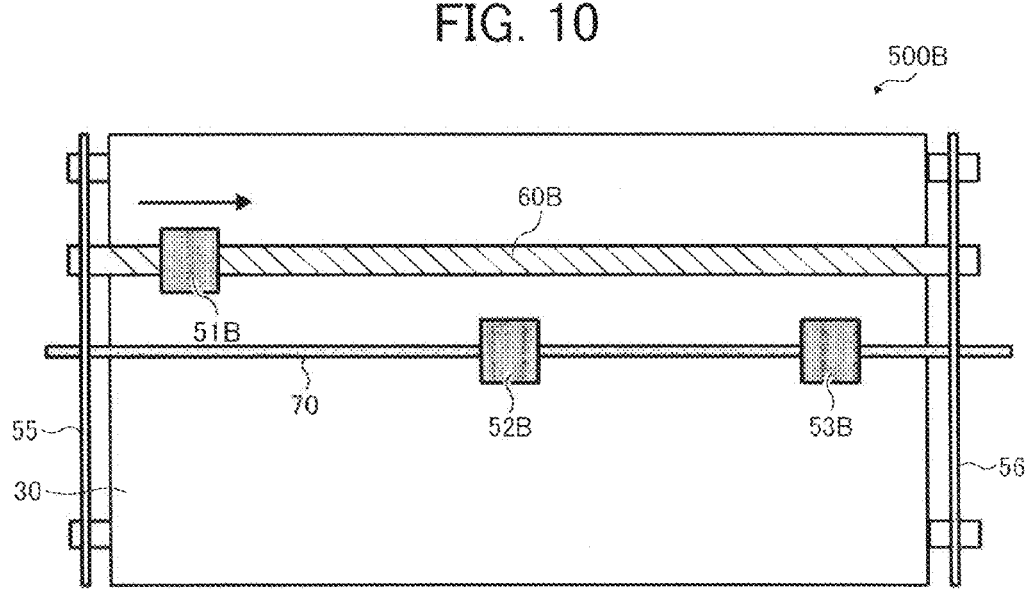
FIG. 10 is a schematic view of a density sensor drive mechanism according to a second embodiment.

Referring now to FIG. 10, a description is given of a density sensor drive mechanism 500B according to the second embodiment.

FIG. 10 is a schematic view of the density sensor drive mechanism 500B.

For mass high-speed printing, the image forming apparatus 1 may have the density sensor drive mechanism 500B. In FIG. 10, three density sensors 51B through 53B are disposed over the width of the intermediate transfer belt 30 serving as an image carrier. Specifically, one movable density sensor 51B and two fixed density sensors 52B and 53B are disposed.

The movable density sensor 51B is movable in the main scanning direction by a drive shaft 60B serving as a density sensor driver. By contrast, the fixed density sensors 52B and 53B are attached to a support member 70 fixed across the width of the intermediate transfer belt 30.

The drive shaft 60B is the same as the drive shaft 60 of FIG. 4. In FIG. 10, the motor 65 and the gears 66 and 67 are omitted for ease of illustration.

In the second embodiment, the movable density sensor 51B is positioned away from the fixed density sensors 52B and 53B in the sub-scanning direction so as not to interrupt the fixed density sensors 52B and 53B while moving. Alternatively, for example, the movable density sensor 51B may be separated from the intermediate transfer belt 30 in a height direction, as long as the movable density sensor 51B can measure the outer circumferential surface of the intermediate transfer belt 30.

In such a configuration, if the movable density sensor 51B is fixed at a position illustrated in FIG. 10 upon measurement that obviates detailed resolution in the main scanning direction for, e.g., correcting the image forming conditions, the measurement can be completed in a shorter time. By contrast, upon measurement that requires detailed resolution in the main scanning direction for, e.g., shading correction, the movable density sensor 51B measures density while moving for the correction as illustrated in FIGS. 8A through 8C.

Although the configuration of FIG. 10 has the plurality of density sensors 51B through 53B and therefore production costs increase, the image forming conditions can be corrected without increasing the standby time. In addition, the unevenness in density in the main scanning direction due to the shading characteristics can be reliably reduced. It is to be noted that the number of density sensors is not limited to three, but can be any number.

Figure 11:
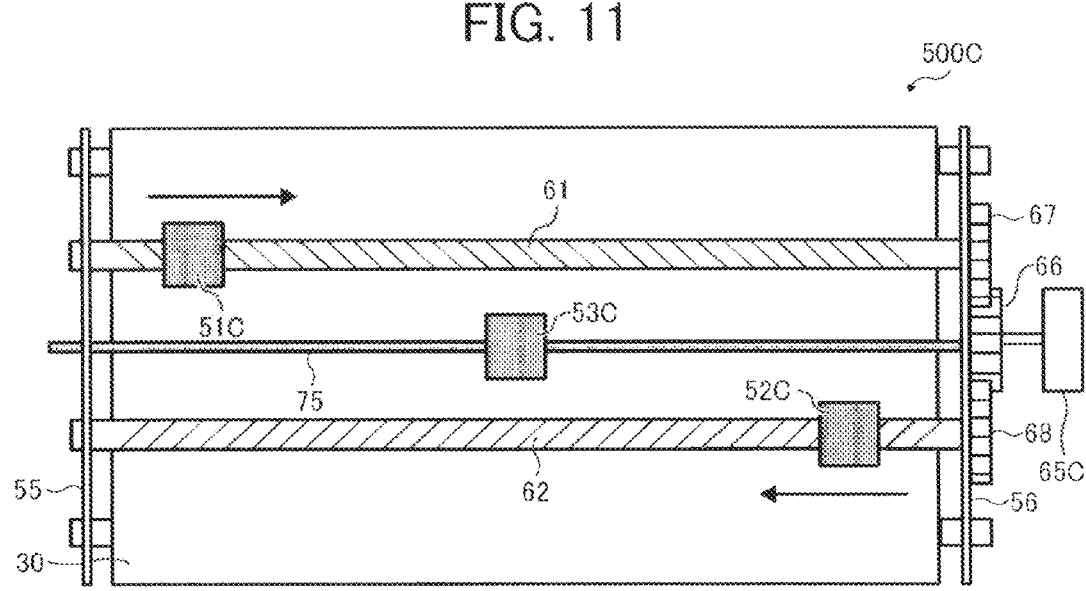
FIG. 11 is a schematic view of a density sensor drive mechanism according to a third embodiment.

Referring now to FIG. 11, a description is given of a density sensor drive mechanism 500C according to the third embodiment.

FIG. 11 is a schematic view of the density sensor drive mechanism 500C.

Unlike the second embodiment, the density sensor drive mechanism 500C drives a plurality of movable density sensors. For example, as illustrated in FIG. 11, density sensors 51C and 52C are movable. In this case, the density sensor 53C is a fixed sensor. The movable density sensors 51C and 52C are attached to drive shafts 61 and 62, respectively. The drive shafts 61 and 62 are threaded, and serve as density sensor drivers.

The drive shaft 61 has an end provided with a gear 67. Similarly, the drive shaft 62 has an end provided with a gear 68. Engaged with the gears 67 and 68 is a gear 66 that is attached to an axis of a stepping motor 65C. Accordingly, the drive shaft 61 and 62 are driven by the stepping motor 65C as a common drive source via the gears 66 through 68. The drive shafts 61 and 62 are threaded in opposite directions. Therefore, the movable density sensors 51C and 52C move in the opposite directions when the stepping motor 65 rotates.

By increasing the number of movable density sensors as in the present embodiment, two reference patterns can be measured by one driving upon shading correction. For example, in an image forming apparatus having development devices for a plurality of colors, reference patterns having different colors may be formed at detection points of the movable density sensors 51C and 52C. In this case, two types of color data can be acquired at once, thereby shortening the measuring time.

As described above, the drive shafts 61 and 62 serving as density sensor drivers are threaded in opposite directions. Alternatively, a single direction in which the drive source rotates allows the movable density sensors 51C and 52C to reciprocate. In such a configuration, although the direction in which the drive source rotates is constant, the movable density sensors 51C and 52C move in opposite directions.

Figure 12:
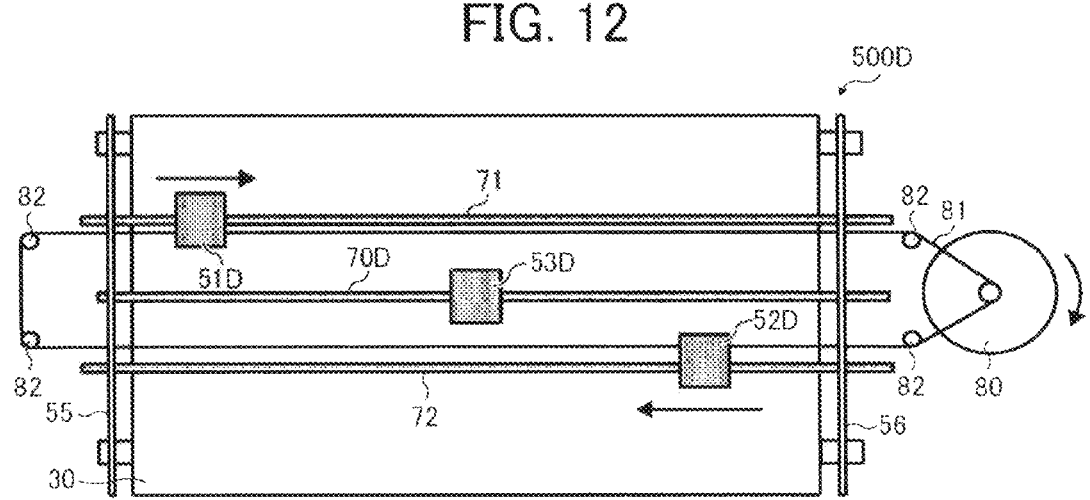
FIG. 12 is a schematic view of a density sensor drive mechanism according to a fourth embodiment.

Referring now to FIG. 12, a description is given of a density sensor drive mechanism 500D according to the fourth embodiment.

FIG. 12 is a schematic view of the density sensor drive mechanism 500D.

Instead of using gears, an endless belt 81 is used as a density sensor driver. In the fourth embodiment, the density sensor drive mechanism 500D drives two movable density sensors 51D and 52D and one fixed density sensor 53D. Like the second and third embodiments, the fixed density sensor 53D is attached to a center of a support member 70D.

The movable density sensors 51D and 52D are slidably disposed on guide rails 71 and 72, respectively, and connected to the endless belt 81 driven by a stepping motor 80 serving as a drive source.

The endless belt 81 is stretched around a plurality of guide rollers 82 along the guide rails 71 and 72. As in the fourth embodiment, the density sensor driver is not limited to the threaded drive shafts 60 through 62, but can by any driver.

Figure 13A:
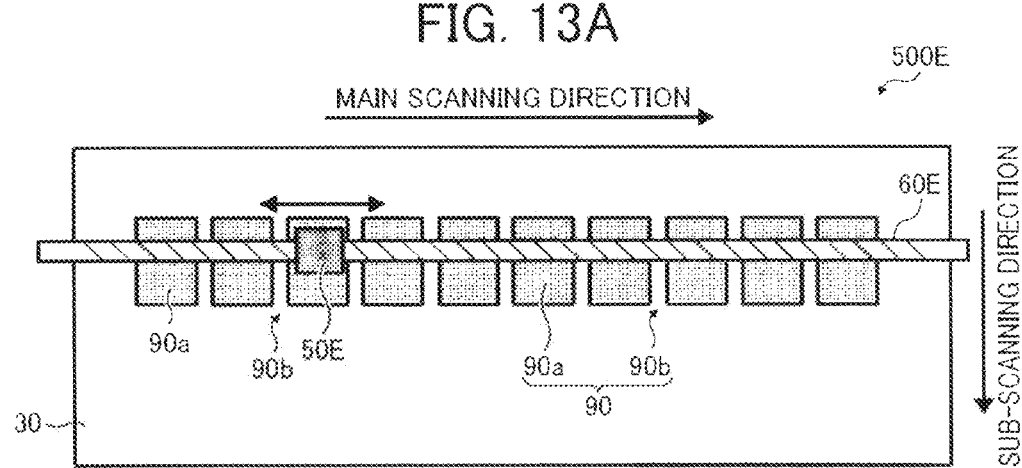
FIG. 13A is a plan view of a density sensor drive mechanism according to a fifth embodiment.
Figure 13B:
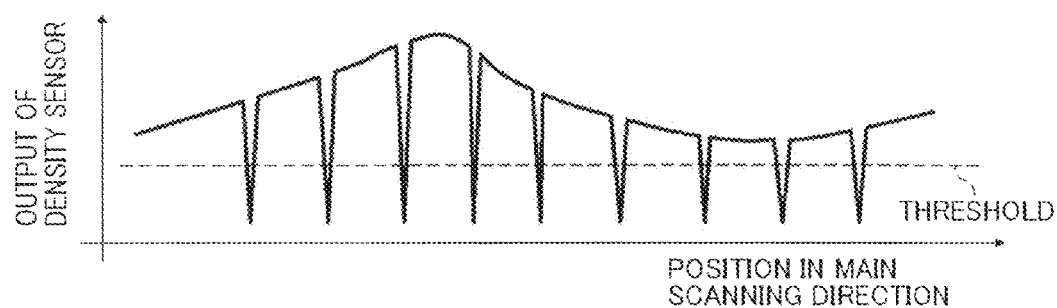
FIG. 13B is a graph of density sensor output according to the fifth embodiment.

Referring now to FIGS. 13A and 13B, a description is given of a density sensor drive mechanism 500E according to the fifth embodiment.

FIG. 13A is a plan view of the density sensor drive mechanism 500E. FIG. 13B is a graph of density sensor output.

The density sensor drive mechanism 500E drives a movable density sensor 50E. In the first embodiment, the positional data of the movable density sensor 50 is acquired from the rotational data of the stepping motor 65 serving as a drive source in the first density sensor positional data process. However, in the fifth embodiment, the processor 1000 acquires positional data of the movable density sensor 50E in a second density sensor positional data acquisition process, in which the processor 1000 calculates a position of the density sensor 50E in the main scanning direction according to detected data of an index part 90b provided by the density sensor 50E. As illustrated in FIG. 13A, a reference pattern 90 includes an imaged part 90a and the index part 90b. With the index part 90b, the reference pattern 90 exhibits intermittent changes in detection density. In short, the processor 1000 acquires the positional data of the movable density sensor 50E in the second density sensor positional data acquisition process using the detection data of the index part 90b of the reference pattern 90, instead of the rotational data of a motor such as the stepping motor 65.

In the present embodiment, the reference pattern 90 is a discontinuous pattern having a blank area as the index part 90b between the imaged parts 90a. When the reference pattern 90 is used, output values of the movable sensor 50E acquired while the movable sensor 50E is moving significantly drops at each index part 90b as illustrated in FIG. 13B.

A threshold output value of the movable density sensor 50E at a boundary between the imaged part 90a and the index part 90b is measured in advance and stored in the ROM 1200 of the processor 1000 illustrated in FIG. 6. By measuring the number of output values of the movable density sensor 50E lower than the threshold during detection, it can be determined which imaged part 90a the movable density sensor 50E currently measures in the main scanning direction.

Such a configuration obviates the need for rotational data of the stepping motor 65 or 80. Accordingly, e.g., a DC motor can be used as a drive source of a drive shaft 60E, instead of a stepping motor such as the stepping motor 65 or 80 that is generally more expensive than a DC motor. For moving the movable density sensor 50E to a reference position, the reference pattern 90 formed at a scannable position on the intermediate transfer belt 30 may obviate the need for the home position mark 57.

Accordingly, in the fifth embodiment, the shading correction can be performed with a less expensive configuration than that of the first embodiment. In addition, since the index part 90b is a blank area in which an image is not formed, the amount of toner used can be reduced.

The index part 90b is formed by the processor 1000 of FIG. 6. The processor 1000 determines the number of the index parts 90b in a first reference pattern formation process, according to, e.g., the resolution of density data required for the shading correction in the main scanning direction. The index parts 90B is formed, e.g., at equal intervals.

Figure 14:
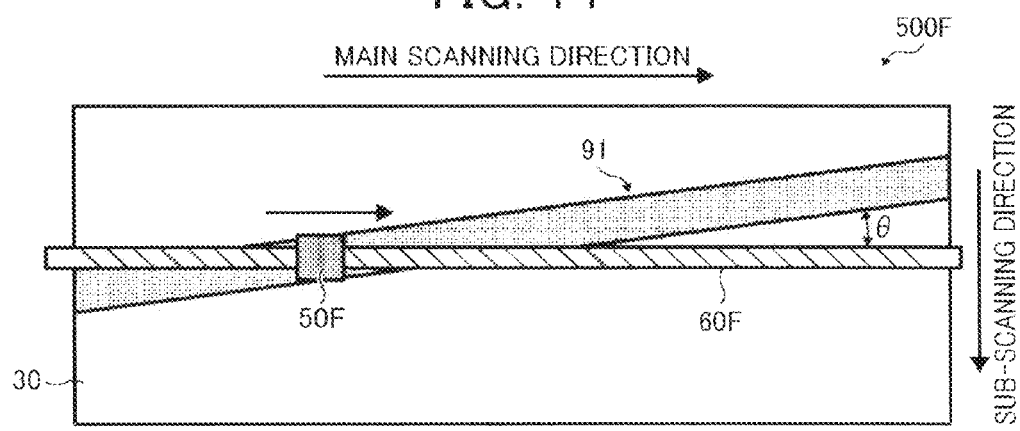
FIG. 14 is a plan view of a density sensor drive mechanism according to a sixth embodiment.
Figure 15:
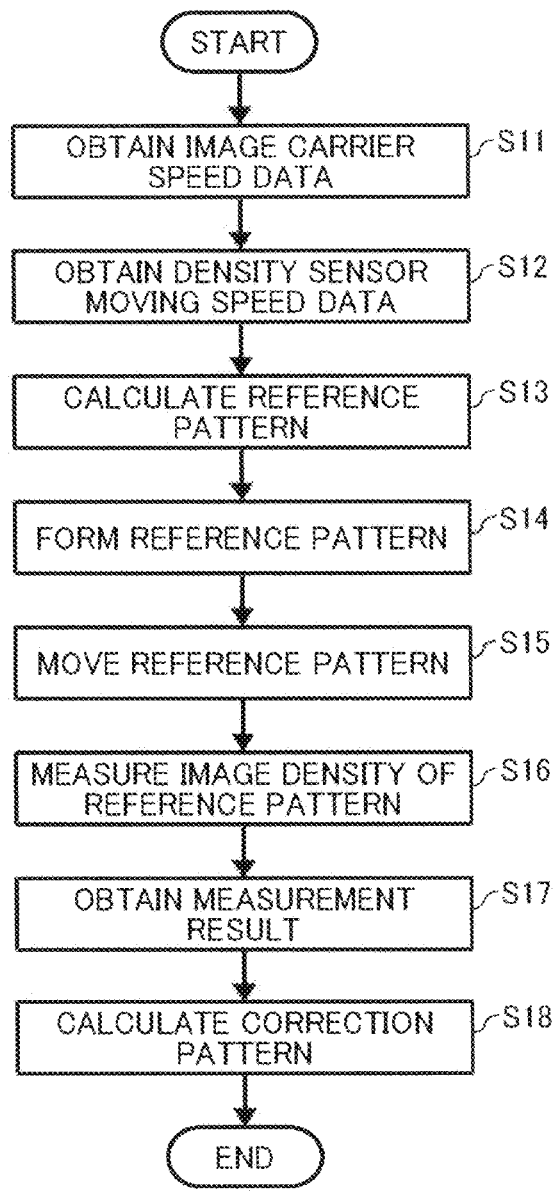
FIG. 15 is a flowchart of a shading correction process according to the sixth embodiment.

Referring now to FIGS. 14 and 15, a description is given of a density sensor drive mechanism 500F according to the sixth embodiment.

FIG. 14 is a plan view of the density sensor drive mechanism 500F. When using the reference pattern 85 of FIG. 8A, the photoconductor 5 serving as an image carrier stops moving in the sub-scanning direction while the movable sensor 50 is moving in the main scanning direction. Similarly, when using the reference pattern 90 of FIG. 13A, the intermediate transfer belt 30 serving as an image carrier stops moving in the sub-scanning direction while the movable sensor 50E is moving in the main scanning direction. In short, stopping and resuming movement of the image carrier are extra processes compared to the comparative shading correction illustrated in FIG. 18.

Hence, in the sixth embodiment, a reference pattern 91 for shading correction is changed according to a relationship between a speed at which the intermediate transfer belt 30 serving as an image carrier rotates in the sub-scanning direction and a speed at which a movable sensor 50F moves in the main scanning direction. The processor 1000 performs a second reference pattern formation process for changing the reference pattern according to a program stored in the ROM 1200 and with the CPU 1100 illustrated in FIG. 6. The CPU 1100 receives the speed at which the intermediate transfer belt 30 rotates in the sub-scanning direction and the speed at which the movable sensor 50F moves in the main scanning direction.

As illustrated in FIG. 14, in the second reference pattern formation process, the processor 1000 forms the reference pattern 91 on the intermediate transfer belt 30 in an oblique direction to the main scanning direction at a predetermined angle θ, such that the reference pattern 91 is constantly at a measurable position of the movable density sensor 50F attached to a drive shaft 60F even while the intermediate transfer belt 30 is moving in the sub-scanning direction.

Accordingly, the shading correction can be performed while continuously moving the intermediate transfer belt 30 serving as an image carrier in the main scanning direction, instead of stopping the intermediate transfer belt 30. Alternatively, the reference pattern 91 may be a discontinuous reference pattern having an index part such as the index part 90b or an imaged area at a predetermined position.

FIG. 15 is a flowchart of a shading correction process according to the sixth embodiment.

When forming the oblique reference pattern 91 of FIG. 14, the shading correction process can be performed as illustrated in FIG. 15.

When a shading correction process starts, the processor 1000 acquires speed data of the image carrier (i.e., intermediate transfer belt 30) (S11) and speed data of the movable density sensor 50F (S12). The speed data of the image carrier and the speed data of the movable density sensor 50F are usually fixed, and therefore, are stored in advance in the ROM 1200 and the RAM 1300 of the image forming apparatus 1.

It is to be noted that, in image forming apparatuses having variable image carrier speed, the speed data is stored in the RAM 1300 every time when the speed is changed such that the latest speed data can be acquired.

Then, the processor 1000 calculates the reference pattern to form (i.e., reference pattern 91) according to the speed data of the image carrier and the speed data of the movable density sensor 50F thus acquired (S13). Subsequent steps S14 through S18 are the same as steps S2 through S6 of FIG. 7.

Figure 16:
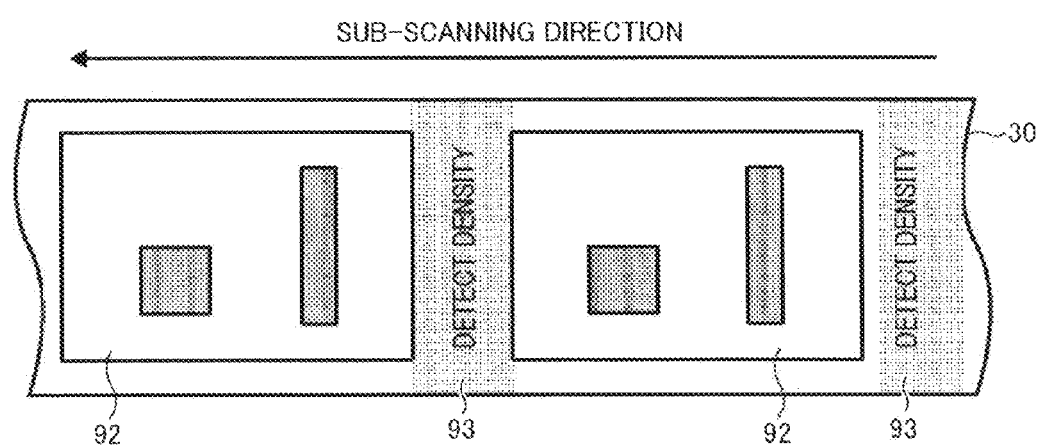
FIG. 16 is a plan view of an image carrier illustrating positions to detect density according to a seventh embodiment.
Figure 17A:
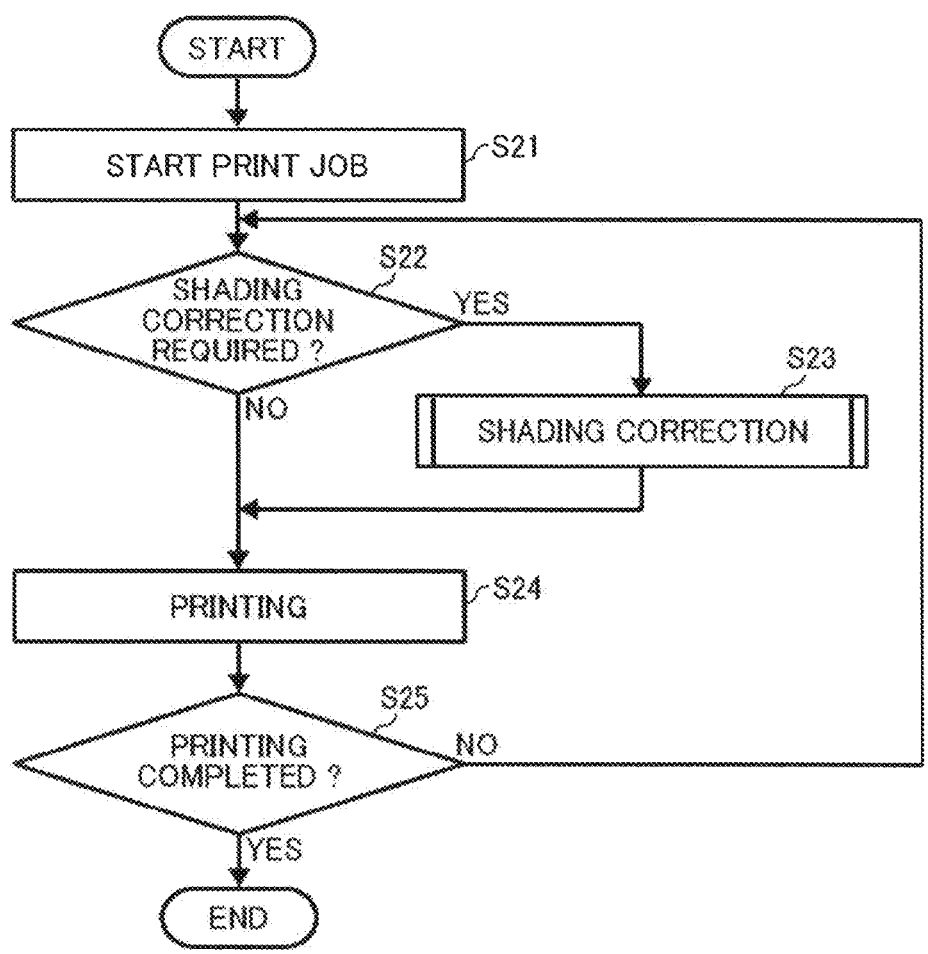
FIG. 17A is an overall flowchart of a print job including determination of whether or not to perform a shading correction process according to the seventh embodiment.
Figure 17B:
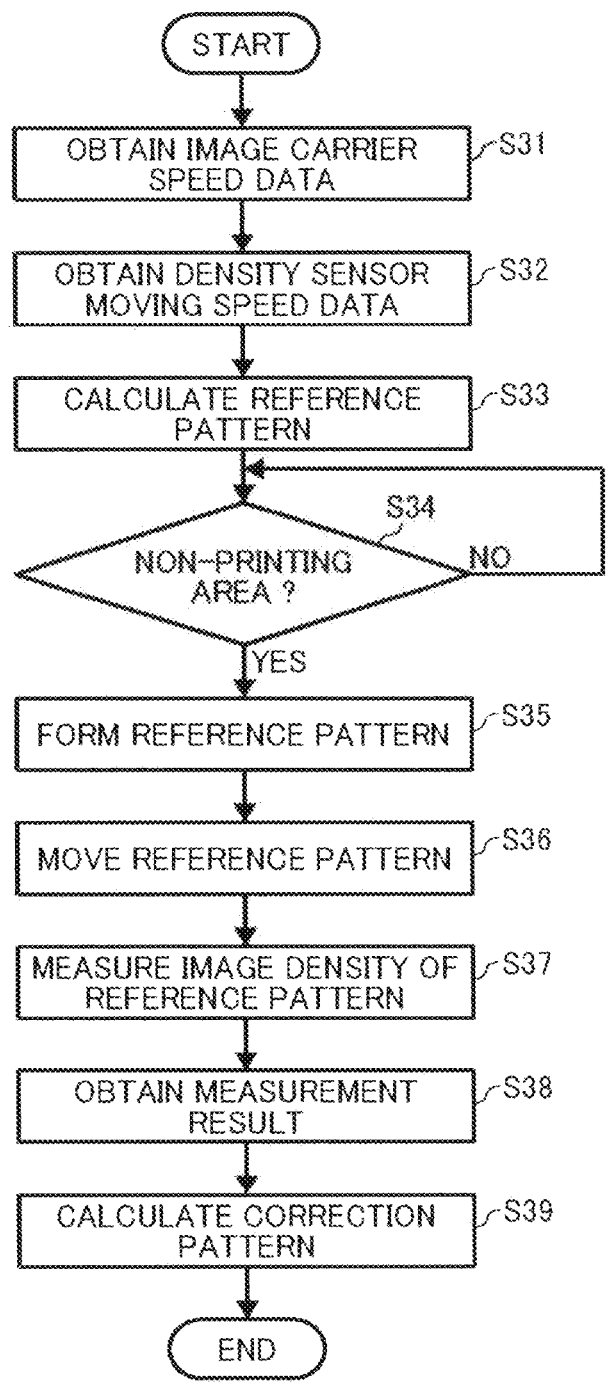
FIG. 17B is a flowchart of the shading correction process illustrated in FIG. 17A.

Referring now to FIGS. 16, 17A and 17B, a description is given of a shading correction process according to the seventh embodiment.

FIG. 16 is a plan view of the intermediate transfer belt 30 serving as an image carrier, illustrating positions to detect density according to the seventh embodiment.

When forming the reference pattern 91 of FIG. 14, the image carrier is not stopped while measuring. Hence, in the seventh embodiment, the shading correction is performed using a test area 93, during printing of a printing area 92 performed by the image forming apparatus 1.

Alternatively, during printing, a density sensor (e.g., density sensor 50) may be moved in the main scanning direction while the shading correction is performed, and the density sensor may be moved back to an initial reference position in the main scanning direction. As a result, the standby time can be shortened.

When the shading correction is performed using the test area 93, the processes of FIGS. 17A and 17B are followed. Specifically, FIG. 17A is an overall flowchart of a print job including determination of whether or not to perform a shading correction process according to the seventh embodiment. FIG. 17B is a flowchart of the shading correction process illustrated in FIG. 17A.

Referring to FIG. 17A, when a print job starts (S21), it is determined whether a shading correction process is required (S22). It may be determined that shading correction is required when, e.g., 1) the image forming apparatus 1 is activated, 2) the temperature and/or humidity have changed by a predetermined amount since the last level, 3) a predetermined time has elapsed after the last shading correction, 4) a predetermined number of sheets have been printed after the last shading correction; or 5) the shading correction is instructed.

Conditions 1 through 5 described above are stored in the ROM 1200 and the RAM 1300. It is determined whether the shading correction process is required according to a program run by the CPU 1100. The conditions such as the above-described conditions 1 through 5 may be any condition derived from the operating environment of the image forming apparatus 1. If it is determined that the shading correction process is not required (NO in S22), then the print job proceeds (S24) and steps S22 through S24 are repeated until it is determined that the print job is completed (YES in S25).

On the other hand, if it is determined that the shading correction process is required (YES in S22), then the shading correction process is performed (S23). The shading correction process is illustrated in FIG. 17B in detail, and is substantially the same as the process of FIG. 15, except that it is determined whether or not a subject area is the test area 93 (S34) before a reference pattern is formed (S35), at which point (YES in S34), the subsequent steps are performed from step S35.

The present invention has been described above with reference to specific exemplary embodiments. It is to be noted that the present invention is not limited to the details of the embodiments described above, but various modifications and enhancements are possible without departing from the scope of the invention. It is therefore to be understood that the present invention may be practiced otherwise than as specifically described herein. For example, elements and/or features of different illustrative exemplary embodiments may be combined with each other and/or substituted for each other within the scope of this invention. The number of constituent elements and their locations, shapes, and so forth are not limited to any of the structure for performing the methodology illustrated in the drawings.

What is claimed is:

1. An image forming apparatus, comprising:
a photoconductor;
an optical scanner, including a light source to emit light, to irradiate a surface of the photoconductor in a main scanning direction with the light to form a latent image on the surface of the photoconductor;
a development device to develop the latent image into a toner image;
a movable first density sensor to continuously detect unevenness in density of the toner image in the main scanning direction while being moved in the main scanning direction by a density sensor driver;
the density sensor driver to move the first density sensor in the main scanning direction; and
a processor to correct a driving signal for the light source according to image data to reduce the unevenness in density in the main scanning direction, according to positional data of the first density sensor in the main scanning direction and output values of the first density sensor obtained while being moved in the main scanning direction.

2. The image forming apparatus according to claim 1, wherein the processor forms a reference pattern for shading correction having a predetermined density detectable by the first density sensor on the photoconductor.

3. The image forming apparatus according to claim 2, further comprising a home position detector disposed at a predetermined position in the main scanning direction of the photoconductor to detect a home position of the first density sensor as a reference for the positional data of the first density sensor in the main scanning direction.

4. The image forming apparatus according to claim 3, wherein the processor performs a first density sensor positional data acquisition process to calculate a position of the first density sensor in the main scanning direction according to data provided by the density sensor driver.

5. The image forming apparatus according to claim 2, wherein the processor performs a second reference pattern formation process to form the reference pattern on the photoconductor in an oblique direction to the main scanning direction at a predetermined angle, such that the reference pattern is detectable regardless of a position of the first density sensor.

6. The image forming apparatus according to claim 5, wherein the processor performs the second reference pattern formation process according to a speed at which the photoconductor rotates in a sub-scanning direction and a speed at which the first density sensor moves in the main scanning direction.

7. The image forming apparatus according to claim 2, wherein the processor forms the reference pattern in a test area between printing areas arranged in a sub-scanning direction of the photoconductor, and detects the reference pattern with the first density sensor while the photoconductor is rotating.

8. The image forming apparatus according to claim 1, wherein the processor forms a reference pattern having an index part at a predetermined position in the main scanning direction and exhibiting intermittent changes in detection density at the index part, and
wherein the processor performs a second density sensor positional data acquisition process to calculate a position of the first density sensor in the main scanning direction according to detection data of the index part provided by the first density sensor.

9. The image forming apparatus according to claim 8, wherein the processor performs a first reference pattern formation process to form the reference pattern having the index part according to a required resolution in the main scanning direction.

10. The image forming apparatus according to claim 1, further comprising a transfer device to transfer the toner image from the photoconductor to a transfer belt,
wherein the processor forms a reference pattern for shading correction having a predetermined density detectable by the first density sensor on the transfer belt.

11. The image forming apparatus according to claim 10, further comprising a home position detector disposed at a predetermined position in the main scanning direction of the transfer belt to detect a home position of the first density sensor as a reference for the positional data of the first density sensor in the main scanning direction.

12. The image forming apparatus according to claim 11, wherein the processor performs a first density sensor positional data acquisition process to calculate a position of the first density sensor in the main scanning direction according to data provided by the density sensor driver.

13. The image forming apparatus according to claim 10, wherein the processor performs a second reference pattern formation process to form the reference pattern on the transfer belt in an oblique direction to the main scanning direction at a predetermined angle, such that the reference pattern is detectable regardless of a position of the first density sensor.

14. The image forming apparatus according to claim 13, wherein the processor performs the second reference pattern formation process according to a speed at which the transfer belt rotates in a sub-scanning direction and a speed at which the first density sensor moves in the main scanning direction.

15. The image forming apparatus according to claim 10, wherein the processor forms the reference pattern in a test area between printing areas arranged in a sub-scanning direction of the transfer belt, and detects the reference pattern with the first density sensor while the transfer belt is rotating.

16. The image forming apparatus according to claim 1, wherein the first density sensor doubles as a sensor for adjusting image density.

17. The image forming apparatus according to claim 1, further comprising a fixed second density sensor for adjusting image density.

18. The image forming apparatus according to claim 1, wherein the density sensor driver moves the first density sensor to a reference position in the main scanning direction during image printing.

* * * * *